(12) United States Patent
Balekai et al.

(10) Patent No.: US 6,401,700 B2
(45) Date of Patent: Jun. 11, 2002

(54) CLOSED LOOP DIESEL ENGINE EGR CONTROL INCLUDING EVENT MONITORING

(75) Inventors: Priyankar S. Balekai, Oak Park; Scott Anderson, Palos Hills; Steven M. Bandy, Aurora, all of IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 4 days.

(21) Appl. No.: 09/733,432

(22) Filed: Dec. 8, 2000

Related U.S. Application Data (60) Provisional application No. 60/169,871, filed on Dec. 9, 1999.

(51) Int. Cl.[7] ............................................... F02M 25/07
(52) U.S. Cl. .............................. 123/568.12; 60/605.2; 701/108; 123/568.16
(58) Field of Search ................. 123/568.11, 568.12, 123/568.16, 568.21; 60/276, 605.2; 701/108

(56) References Cited

U.S. PATENT DOCUMENTS

| | | | |
|---|---|---|---|
| 4,279,235 A | | 7/1981 | Flaig et al. |
| 4,432,331 A | * | 2/1984 | Yasuhara ............... 123/568.16 |
| 4,665,882 A | | 5/1987 | Otobe et al. |
| 5,755,094 A | * | 5/1998 | Maki et al. ............... 60/276 |
| 5,823,164 A | | 10/1998 | Seki et al. |
| 5,964,820 A | * | 10/1999 | Miwa et al. ............ 123/568.16 |
| 6,026,790 A | * | 2/2000 | Itoyama ................ 123/568.16 |
| 6,035,639 A | | 3/2000 | Kolmanovsky et al. |
| 6,035,640 A | | 3/2000 | Kolmanovsky et al. |
| 6,067,799 A | | 5/2000 | Heinitz et al. |
| 6,067,800 A | | 5/2000 | Kolmanowsky et al. |
| 6,076,353 A | | 6/2000 | Freudenberg et al. |
| 6,095,127 A | | 8/2000 | Kolmanovsky et al. |
| 6,125,823 A | | 10/2000 | Thomas |
| 6,131,539 A | | 10/2000 | Thomas |
| 6,134,889 A | | 10/2000 | Markyvech et al. |
| 6,134,890 A | | 10/2000 | Church et al. |
| 6,148,616 A | * | 11/2000 | Yoshida et al. ............ 60/605.2 |

FOREIGN PATENT DOCUMENTS

| | | |
|---|---|---|
| DE | 43 22 319 A | 1/1995 |
| DE | 1969 07 071 A1 | 8/1997 |
| EP | 0 884 466 A1 | 12/1998 |
| FR | 2 753 488 A | 3/1998 |

* cited by examiner

Primary Examiner—Willis R. Wolfe
(74) Attorney, Agent, or Firm—Dennis Kelly Sullivan; Jeffrey P. Calfa; Neil T. Powell (57) ABSTRACT

A control system and method for an EGR valve, particularly in a diesel engine. A processor processes data in feedback control of the position of the valve element to develop from the data a position control signal for setting the extent to which the valve is open. The processing includes processing data corresponding to actual position of the valve and data representing a desired position of the valve to develop a position error signal, processing data that defines actual EGR rate and data representing a desired EGR rate to develop a rate error signal, and processing the position error signal and the rate error signal to develop the position control signal. Emission control system event monitors flag potential error sources in their incipiency to afford opportunity for correction before mandatory logging occurs.

35 Claims, 11 Drawing Sheets

FIG. 4
1.6.2 DETERMINE DESIRED EGR RATE

CLOSED LOOP DIESEL ENGINE EGR CONTROL INCLUDING EVENT MONITORING

REFERENCE TO A RELATED APPLICATION AND PRIORITY CLAIM

This application derives from, and claims the priority of, the following commonly owned provisional patent application Ser. No. 60/169,871, filed Dec. 9, 1999.

FIELD OF THE INVENTION

This invention relates generally to internal combustion engines. More particularly the invention relates to control of EGR (exhaust gas recirculation) in a turbocharged diesel engine. The invention also relates to monitoring certain events involving emission control.

Controlled engine exhaust gas recirculation is a known technique for reducing oxides of nitrogen in products of combustion that are exhausted from an internal combustion engine to atmosphere. A typical EGR system comprises an EGR valve that is controlled in accordance with engine operating conditions to regulate the amount of engine exhaust gas that is recirculated to the intake flow entering the engine so as to limit the combustion temperature and hence reduce the formation of oxides of nitrogen during combustion. To the extent that exhaust gas is introduced into the flow entering the engine, it displaces air that would otherwise enter the engine.

Supercharging is one method for increasing engine torque and power. One type of supercharger comprises a turbocharger that comprises a compressor that boosts intake system pressure and a turbine that is powered by engine exhaust to operate the compressor. It is believed that turbocharged engines may provide fuel economy improvements for enabling vehicle manufacturers to achieve both mandated fuel economy requirements and a desired level of engine performance. However, because such engines must also comply with mandated tailpipe emission requirements, they are likely to require EGR systems.

A general aspect of the invention relates to a control system for a valve that controls exhaust gas recirculation in an internal combustion engine by selectively positioning a valve element that establishes the extent to which the valve is open. The control system comprises a processor that is configured for processing data in feedback control of the position of the valve element to develop from the data a position control signal for setting the extent to which the valve is open, including processing data corresponding to actual position of the valve element and data representing a desired position of the valve element to develop a position error signal, processing data that defines actual EGR rate and data representing a desired EGR rate to develop a rate error signal, and processing the position error signal and the rate error signal to develop the position control signal.

Another general aspect relates to a method for control of exhaust gas recirculation in an internal combustion engine by selectively positioning a valve element that establishes the extent to which an exhaust gas recirculation valve is open. The method comprises processing data in feedback control of the position of the valve element to develop from the data a position control signal for setting the extent to which the valve is open, including processing data corresponding to actual position of the valve element and data representing a desired position of the valve element to develop a position error signal, processing data that defines actual EGR rate and data representing a desired EGR rate to develop a rate error signal, and processing the position error signal and the rate error signal to develop the position control signal.

Still another aspect relates to an event monitoring system in an exhaust gas recirculation system of an internal combustion engine comprising an exhaust gas recirculation valve through which exhaust gas is recirculated and which comprises a valve element that is selectively positioned by a position error signal in a feedback loop of a closed loop control to establish the extent to which the valve is open. The event monitoring system comprises a valve monitor for monitoring the time for which the magnitude of the position error signal exceeds a position error threshold and for logging the occurrence of an event when the time for which the magnitude of the position error signal exceeds the position error threshold exceeds a time threshold.

Still another aspect relates to a method of event monitoring in an exhaust gas recirculation system of an internal combustion engine comprising an exhaust gas recirculation valve through which exhaust gas is recirculated and which comprises a valve element that is selectively positioned by a position error signal in a feedback loop of a closed loop control to establish the extent to which the valve is open. The method comprises monitoring the time for which the magnitude of the position error signal exceeds a position error threshold and logging the occurrence of an event when the time for which the magnitude of the position error signal exceeds the position error threshold exceeds a time threshold.

Still another aspect relates to an event monitoring system in an exhaust gas recirculation control system of an internal combustion engine wherein the event monitoring system comprises a first monitor for monitoring the time for which the magnitude of a signal used in the control system exceeds a first threshold and for logging the occurrence of a first event when the time for which the magnitude of the signal exceeds the first threshold exceeds a first time threshold, and a second monitor for monitoring the time for which the magnitude of the signal exceeds a second threshold and for logging the occurrence of a second event when the time for which the magnitude of the signal exceeds the second threshold exceeds a second time threshold.

Still another aspect relates to an event monitoring system in an internal combustion engine emission control system wherein the event monitoring system comprises a first monitor for monitoring the time for which the magnitude of a signal used in the emission control system exceeds a first threshold and for logging the occurrence of a first event when the time for which the magnitude of the signal exceeds the first threshold exceeds a first time threshold, and a second monitor for monitoring the time for which the magnitude of the signal exceeds a second threshold and for logging the occurrence of a second event when the time for which the magnitude of the signal exceeds the second threshold exceeds a second time threshold.

Still another aspect relates to an event monitoring method in an internal combustion engine emission control system wherein the method comprises monitoring the time for which the magnitude of a signal used in the emission control system exceeds a first threshold and logging the occurrence of a first event when the time for which the magnitude of the signal exceeds the first threshold exceeds a first time threshold, and monitoring the time for which the magnitude of the signal exceeds a second threshold and for logging the occurrence of a second event when the time for which the magnitude of the signal exceeds the second threshold exceeds a second time threshold.

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE INVENTION

Figure 1:
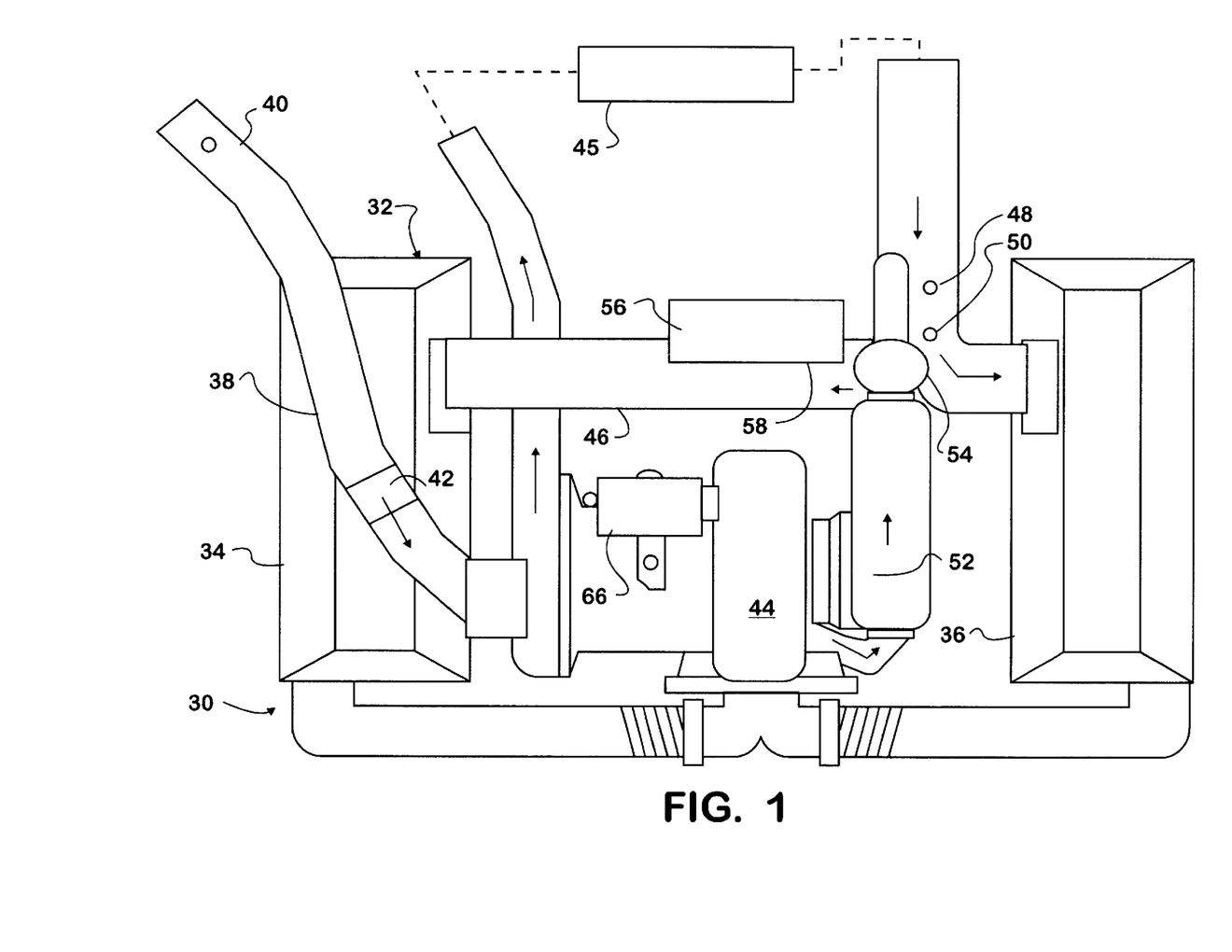
FIG. 1 is a schematic diagram that includes air intake and EGR systems of a turbocharged diesel engine.

FIG. 1 shows a V-type diesel engine 30 having an air intake system 32 that includes a right intake manifold 34 for a right cylinder bank and a left intake manifold 36 for a left cylinder bank. Fresh air enters intake system 32 through an air filter, or air cleaner, and passes through an inlet duct 38. A barometric absolute pressure (BAP) sensor 40 and a mass air flow (MAF) sensor 42 are associated with duct 38 to provide electric signal measurements of barometric air pressure and of mass air flow entering the engine.

Pressure of the fresh intake air is boosted by a turbocharger 44 driven by hot engine exhaust gases leaving the engine to create charge air for engine 10. The heated charge air is forced through a charge air cooler 45 before entering a crossover passage 46 that delivers cooled charge air to both manifolds 34 and 36. A manifold absolute pressure (MAP) sensor 48 and a manifold charge temperature (MCT) sensor 50 are disposed to provide respective electric signals of manifold absolute pressure and temperature of the cooled charge air in the manifolds.

Engine exhaust gas for recirculation into air intake system 32 is first cooled in an EGR cooler 52 before passing to the inlet port of an EGR valve 54. EGR valve 54 is a device that comprises an electric actuator 56 for controlling the extent to which the valve opens and a position sensor 58 for signaling the actual amount of valve opening. Exhaust gas that valve 54 allows to recirculate leaves the valve through an outlet port to enter crossover passage 46.

Figure 2:
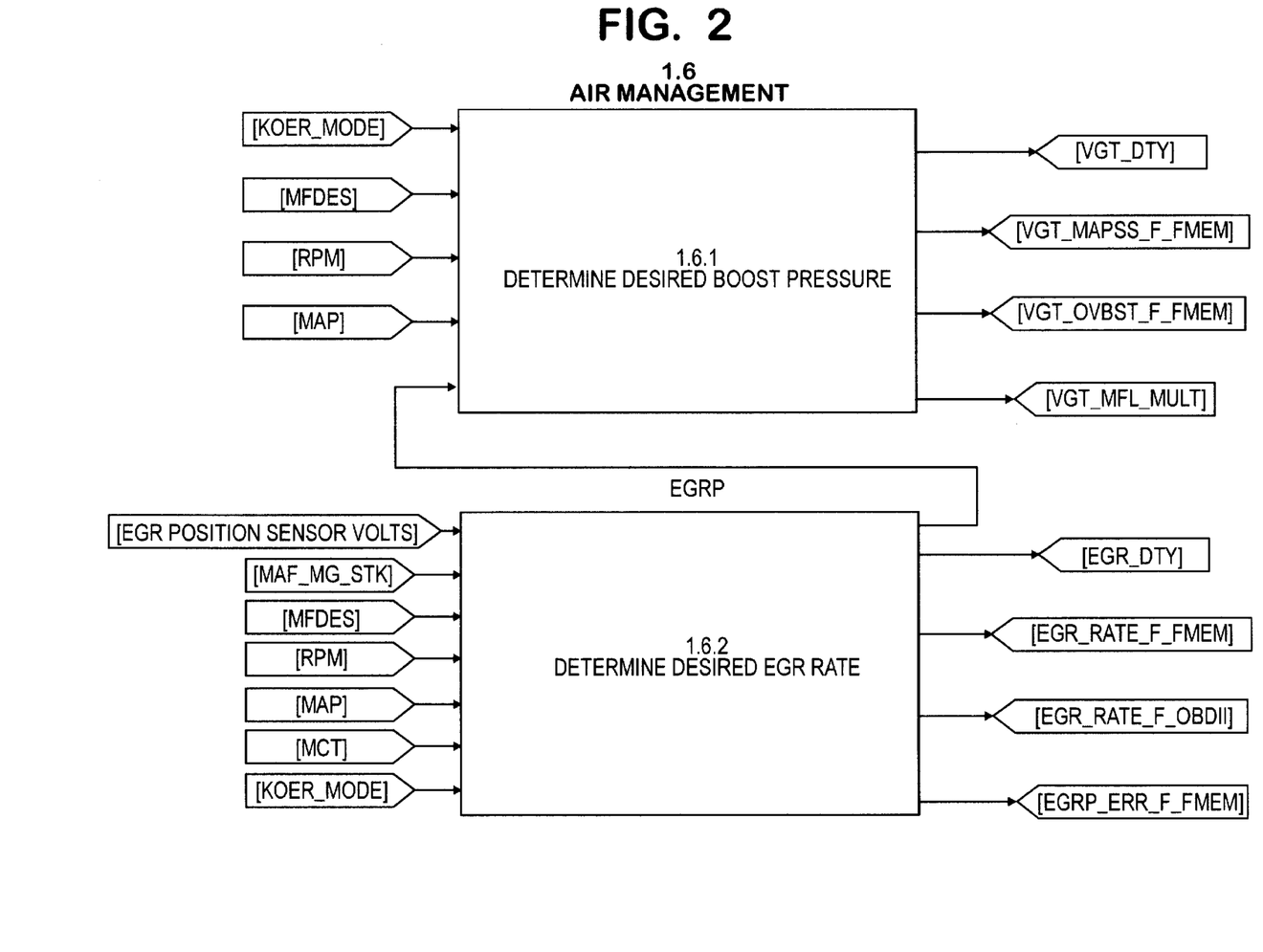
FIG. 2 is general block diagram of an air management control strategy for the engine of FIG. 1.

The air intake system 32 is managed by a control strategy 1.6 shown generally in FIG. 2. Control strategy 1.6 processes the various inputs shown in the Figure to determine desired boost pressure (block 1.6.1) and desired EGR rate (block 1.6.2). The control strategy develops respective duty cycle signals VGT_DTY and EGR_DTY for operating an actuator 66 of turbocharger 44 and EGR valve actuator 56 respectively via respective driver circuits (not specifically shown).

Figure 3:
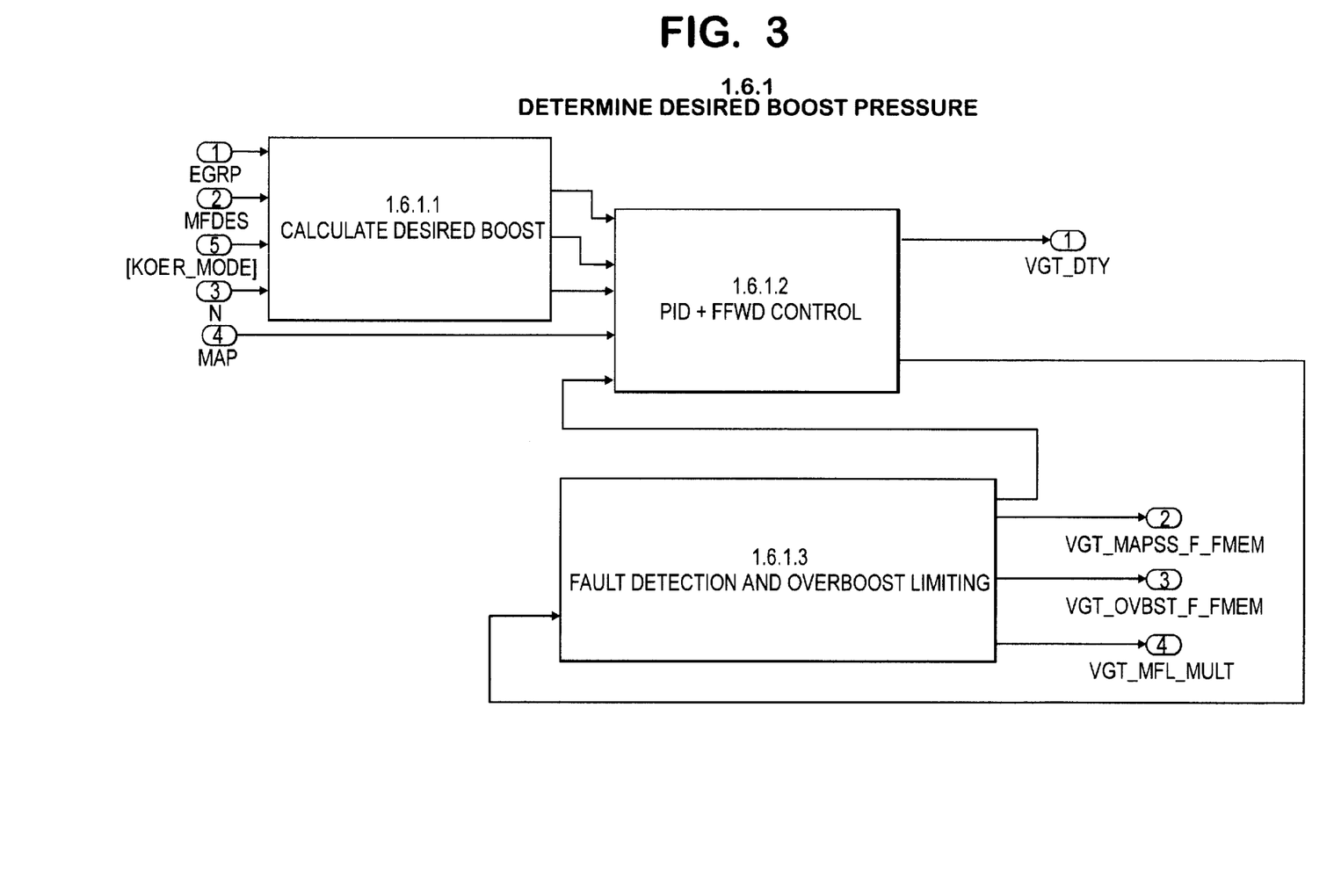
FIG. 3 is a more detailed diagram of one of the blocks of FIG. 2.

FIG. 3 shows various blocks that collectively constitute block 1.6.1, including a Calculation of Desired Boost block 1.6.1.1, a PID and FFWD Control block 1.6.1.2, and a Fault Detection and Overboost Limiting block 1,6.1.3. Turbocharger 44 is a device that is controlled by signal VGT_DTY to develop a desired boost pressure of the charge air in air intake system 32 downstream of the turbocharger. Signal VGT_DTY may change as various engine operating conditions change to cause turbocharger 44 to develop boost pressure appropriate to those conditions. In developing signal VGT_DTY, the portion of the strategy executed by PID and FFWD Control block 1.6.1.2 comprises processing certain data in performance of a proportional, integral, and derivative function and a feedforward function. Manifold pressure data from MAP sensor 48 is utilized in certain processing that is performed both by PID and FFWD Control block 1.6.1.2 and by Fault Detection and Overboost Limiting block 1.6.1.3. Events that indicate a potential for undesired overboost are monitored and logged, and corrective action to avoid undesired overboost is taken by limiting boost whenever an event would otherwise cause undesired overboost.

Figure 4:
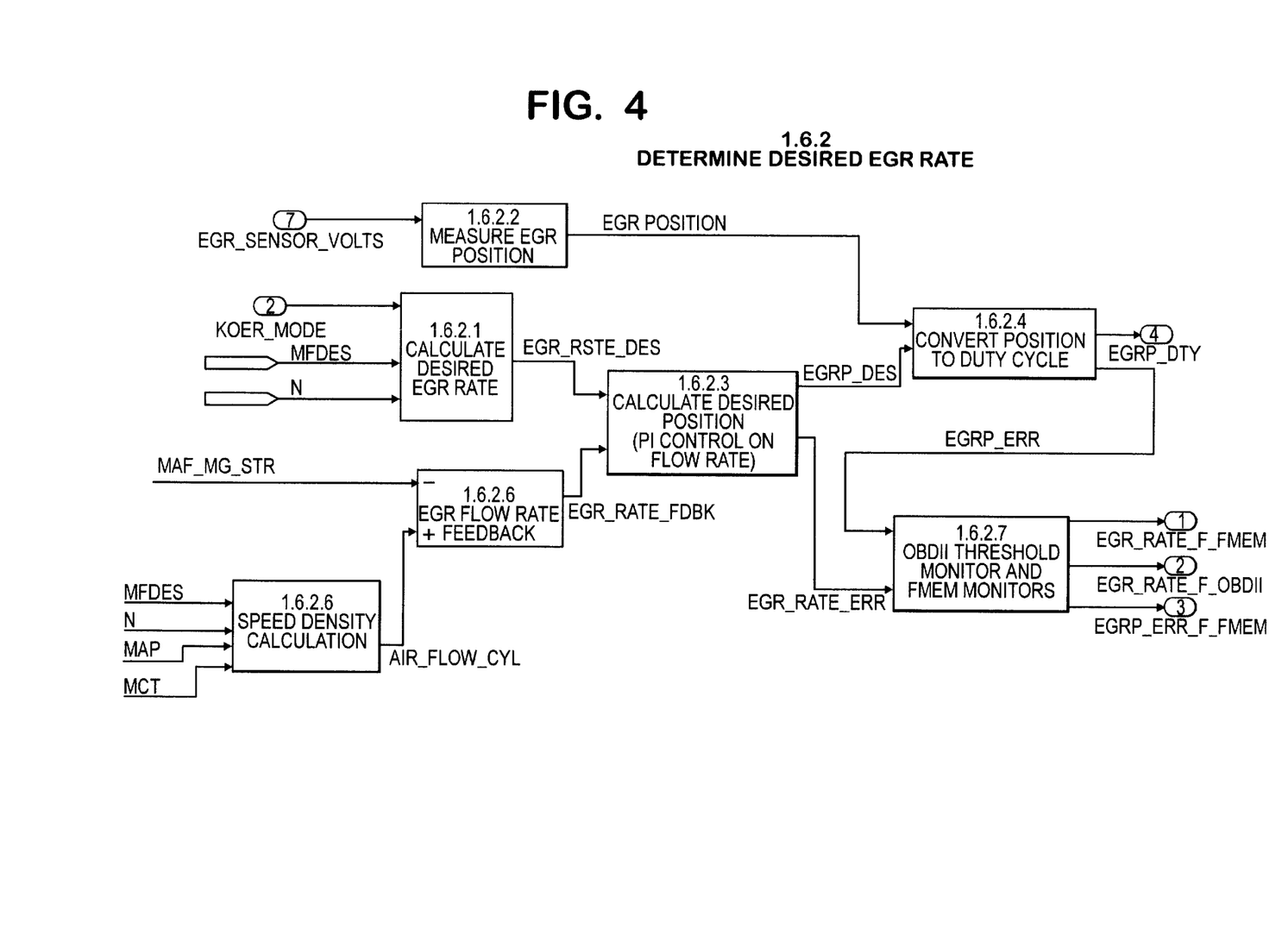
FIG. 4 is a more detailed diagram of another of the blocks of FIG. 2.

FIG. 4 shows detail of the portion of the control strategy represented by block 1.6.2, including a Measure EGR Position block 1.6.2.2 for measuring the extent to which EGR valve 54 is open, a Calculate Desired EGR Rate block 1.6.2.1 for calculating desired EGR rate, a Calculate Desired Position block 1.6.2.3 for calculating desired opening of EGR valve 54, a Convert Position To Duty Cycle block 1.6.2.4 for developing a duty cycle signal that controls EGR valve 54, a Speed Density Calculation block 1.6.2.5 for calculating flow into the engine cylinders using a speed density calculation, an EGR Flow Rate Feedback block 1.6.2.6 for developing an EGR rate signal that is used as feedback during execution of the control strategy, and an OBD II Threshold Monitor and FMEM Monitors block 1.6.2.7 for monitoring and logging the occurrence of certain events.

Figure 5:
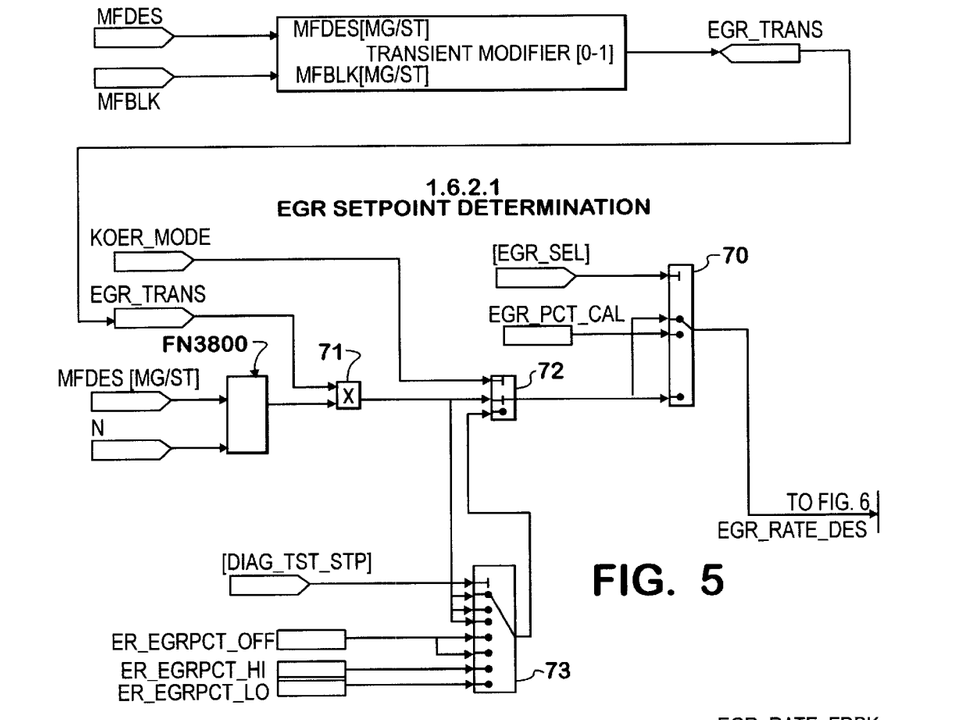
FIG. 5 is a more detailed diagram of a first block of FIG. 4.
Figure 6:
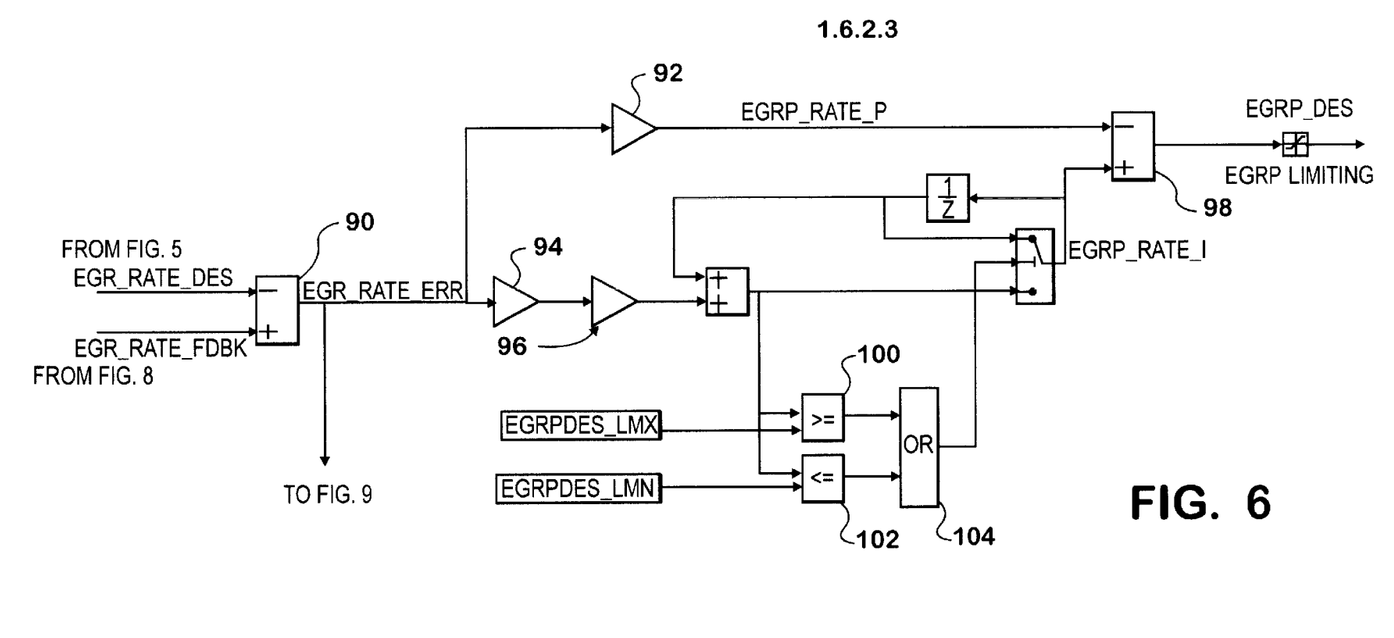
FIG. 6 is a more detailed diagram of a second block of FIG. 4.
Figure 7:
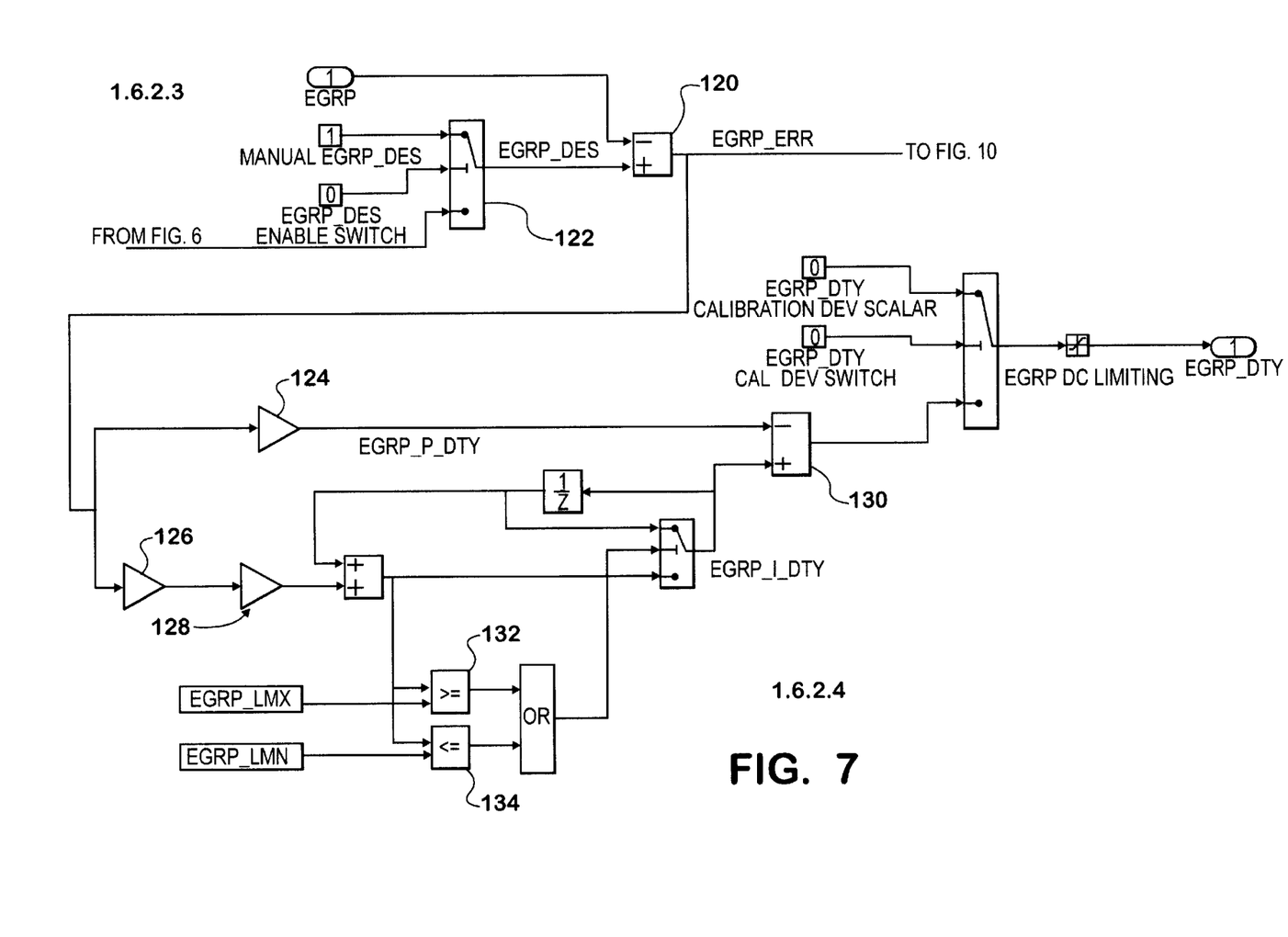
FIG. 7 is a more detailed diagram of a third block of FIG. 4.
Figure 8:
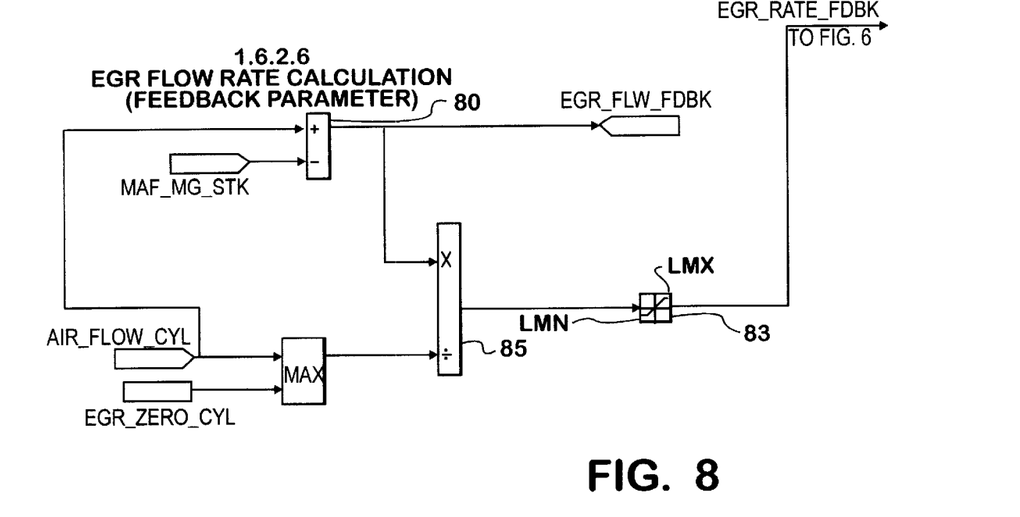
FIG. 8 is a more detailed diagram of a fourth block of FIG. 4.

FIGS. 5–10 show further detail of individual blocks that collectively constitute the more general block 1.6.2. FIG. 5 shows detail of block 1.6.2.1; FIG. 6, detail of block 1.6.2.3; FIG. 7, detail of block 1.6.2.4; FIG. 8, detail of block 1.6.2.6; and FIGS. 9 and 10, detail of block 1.6.2.7.

For calculating the position to which EGR valve 58 should operate, i.e. the extent to which valve 58 should open, two PI control loops are cascaded in series (block 1.6.2.3 and block 1.6.2.4). Block 1.6.2.3 performs closed loop PI control of EGR flow rate, developing the data signal EGRP_DES as a setpoint input to block 1.6.2.4 which in turn develops signal EGRP_DTY for controlling EGR valve position.

FIG. 4 shows that a signal from EGR position sensor 58 closes an inner feedback loop around block 1.6.2.4 for feedback control of EGR valve position. The sensor signal comprises a voltage that is processed to develop an EGR position signal suitable for processing by block 1.6.2.4. The control strategy further comprises processing certain data to calculate: desired EGR rate (signal EGR_RATE_DES) and EGR rate feedback (signal EGR_RATE_FDBK). The desired EGR rate and the EGR rate feedback are processed according to the strategy of block 1.6.2.3 to develop desired EGR position (signal EGRP_DES), and the latter is processed with the EGR position signal to develop the signal EGRP_DTY for controlling EGR position.

The signal EGRP_DTY is a duty cycle control signal that is applied to valve actuator 56 to cause EGR valve 54 to be positioned, i.e. opened, in correlation with the duty cycle of signal EGRP_DTY. The control strategy represented by block 1.6.2.4 utilizes an inner P-I (proportional-integral) control loop having a relatively faster response, a 30 ms. time constant for example, than an outer feedback loop that utilizes signal EGR_RATE_FDBK as feedback and signal EGR_RATE_DES as the command.

FIG. 5 shows that portion of the strategy which develops the data signal EGR_RATE_DES representing desired EGR rate. That portion of the strategy is sometimes referred to as EGR Setpoint Determination, or alternatively, Desired EGR Rate Calculation. Desired EGR rate is a function of mass fuel rate and engine speed. The strategy utilizes a data signal MFDES that represents desired mass fuel rate and a data signal N that represents actual engine speed and is available from any suitable source representing that speed. The signal MFDES is itself derived from various data sources and commands the engine fuel delivery system to introduce fuel into the engine cylinders at a rate corresponding to the value of the signal. Hence, signal MFDES may represent desired mass of fuel, in appropriate units of measurement, injected per power stroke of the engine, into an engine cylinder, such as a number of milligrams of fuel injected into a cylinder per power stroke for example. The strategy further includes processing data signal MFDES and data signal N through a two-dimensional map, or look-up table, FN3800, that correlates various EGR rate values with various combinations of mass fuel rate and engine speed. Hence, for given values of MFDES and N, the map supplies a corresponding value representing an EGR rate appropriate to those values.

The value from the map becomes the data signal EGR_RATE_DES except at times of calibration that may occur during engine development and at times of certain transients that may impact EGR rate. A calibration development switch (reference numeral 70) allows a calibration data signal EGR_PCT_CAL, instead of the value from map FN3800, to become signal EGR_RATE_DES when a signal EGR_SEL is calling for calibration. The signal EGR_PCT_CAL may be varied during calibration to ascertain a value for EGR_RATE_DES that provides desired calibration. EGR rate is modified during certain transient conditions, such as transients in fuel delivery. The map value is multiplied (step 71) by a data signal EGR_TRANS corresponding to the transient, causing EGR_RATE_DES to be similarly multiplied. The multiplication factor is a decimal value that does not exceed unity.

FIG. 5 also shows what is referred to as a KOER mode. That mode is utilized during certain service diagnostic procedures that may be performed from time to time on the engine when the vehicle is being serviced. When such a diagnostic procedure is to be performed, the KOER mode is invoked by a signal KOER_MODE that acts on a switch 72 to cause signal EGR_RATE_DES to be determined by certain test equipment (not shown) connected to a diagnostic test strip 73.

FIG. 8 shows a portion of the strategy for developing EGR rate feedback. The strategy involves certain calculations utilizing data from certain sensors. Mass flow into the engine cylinders, which comprises both fresh air that passed through inlet duct 38 and exhaust gas being recirculated through EGR valve 54, is calculated according to known speed-density techniques using manifold absolute pressure data from MAP sensor 48 and mass charge temperature data from temperature sensor 50. The result of the calculation is a data signal AIR_FLOW_CYL. To calculate the exhaust gas rate, the strategy must exclude the fresh air rate and so it subtracts (step 80) from signal AIR_FLOW_CYL, a data signal MAF_MG_STK, which is obtained from MAF sensor 42. So long as the calculated EGR rate is between a certain minimum limit EGR_RATE_LMN and a certain maximum limit EGR_RATE_LMX, as represented by block 83, the calculated value becomes the signal EGR_RATE_FDBK. Whenever the calculated EGR rate exceeds the maximum, that limit becomes the signal EGR_RATE_FDBK, and whenever the calculated EGR rate is below the minimum, that limit becomes the signal EGR_RATE_FDBK. A block 85 labeled EGR Rate Feedback performs a calculation that scales the signal EGR_FLW_FDBK for proper compatibility with the scale of signal AIR_FLOW_CYL (signal EGR_FLW_FDBK is used for monitoring only and is in different units of measurement, milligrams per stroke for example) and that performs a division operation to yield the EGR flow rate in proper units of measurement. For avoidance of any potential divide-by-zero situation where the value of signal AIR_FLOW_CYL might be zero, or substantially zero, a small non-zero value represented by signal EGR_ZERO_CYL is used instead of signal AIR_FLOW_CYL for the division operation. The signal EGR_RATE_FDBK may be expressed as a percentage.

FIG. 6 shows that desired EGR rate, as represented by EGR_RATE_DES, and EGR rate feedback, as represented by EGR_RATE_FDBK, are processed, by subtraction (step 90) of the latter from the former, to generate an EGR rate error data signal, EGR_RATE_ERR. The PI control strategy represented by block 1.6.2.3 comprises multiplying (step 92) signal EGR_RATE_ERR by a factor KP to develop a data signal EGR_RATE_P. It also comprises multiplying (step 94) signal EGR_RATE_ERR by a factor KI and integrating (step 96) that product to create a data signal EGR_RATE_I. The two data signals EGR_RATE_P and EGR_RATE_I are summed (step 98) to create a data signal EGRP_DES representing desired EGR position.

So long as the calculated data signal EGR_RATE_I is within a range between certain limits, the calculated value becomes the signal EGRP_DES. Whenever the calculated data signal EGR_RATE_I falls outside this range, the signal EGRP_DES is limited. Limiting is performed by comparing data signal EGR_RATE_I with defined data signals EGRPDES_LMX and EGRPDES_LMN representing respective limits (steps 100, 102 respectively). When the calculated value of EGR_RATE_I equals or exceeds the maximum limit defined by EGRPDES_LMX, or (reference numeral 104) when the calculated value is equal to or less than the minimum limit of the range, the previously calculated value is used for signal EGR_RATE_I.

FIG. 7 shows that the EGR position signal derived from sensor 58 is subtracted (step 120) from the calculated data signal EGRP_DES to create an EGR position error signal EGRP_ERR. FIG. 7 further shows that for diagnostic and/or development purposes, a switch 122 may be used to substitute a selectable value instead of the calculated value for signal EGRP_DES. The PI control according to the strategy represented by block 1.6.2.4 comprises multiplying (step 124) signal EGRP_ERR by a factor KP to develop a data signal EGRP_P_DTY. It also comprises multiplying (step 126) signal EGRP_ERR by a factor KI and integrating (step 128) the product to create a data signal EGRP_I_DTY. The two data signals EGRP_P_DTY and EGRP_I_DTY are summed (step 130) to create the data signal EGRP_DTY.

So long as the calculated data signal EGRP_I_DTY is within a range between certain limits, the calculated value becomes the signal EGRP_DTY. Whenever the calculated data signal EGRP_I_DTY falls outside this range, the signal EGRP_DTY is limited. Limiting is performed by comparing (steps 132, 134 respectively) data signal EGRP_I_DTY with defined data signals EGRP_DTY_LMX and EGRP_DTY_LMN representing respective limits. When the calculated value of EGRP_I_DTY exceeds the maximum limit defined by EGRP_DTY_LMX, that limit becomes the signal EGRP_I_DTY, and whenever the calculated value is below the minimum limit of the range, that limit becomes the signal EGRP_I_DTY.

Figure 9:
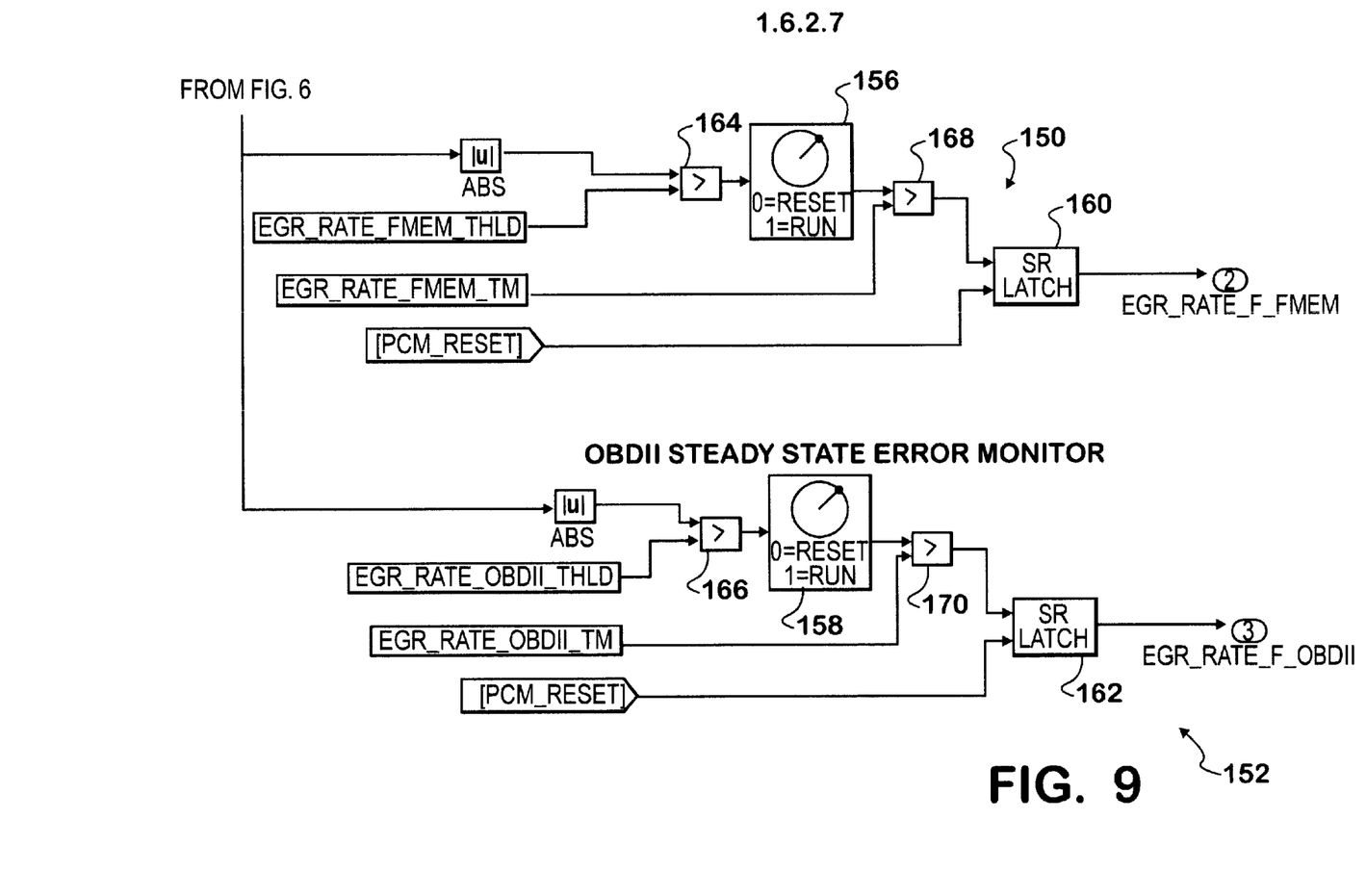
FIG. 9 is a more detailed diagram of one portion of a fifth block of FIG. 4.
Figure 10:
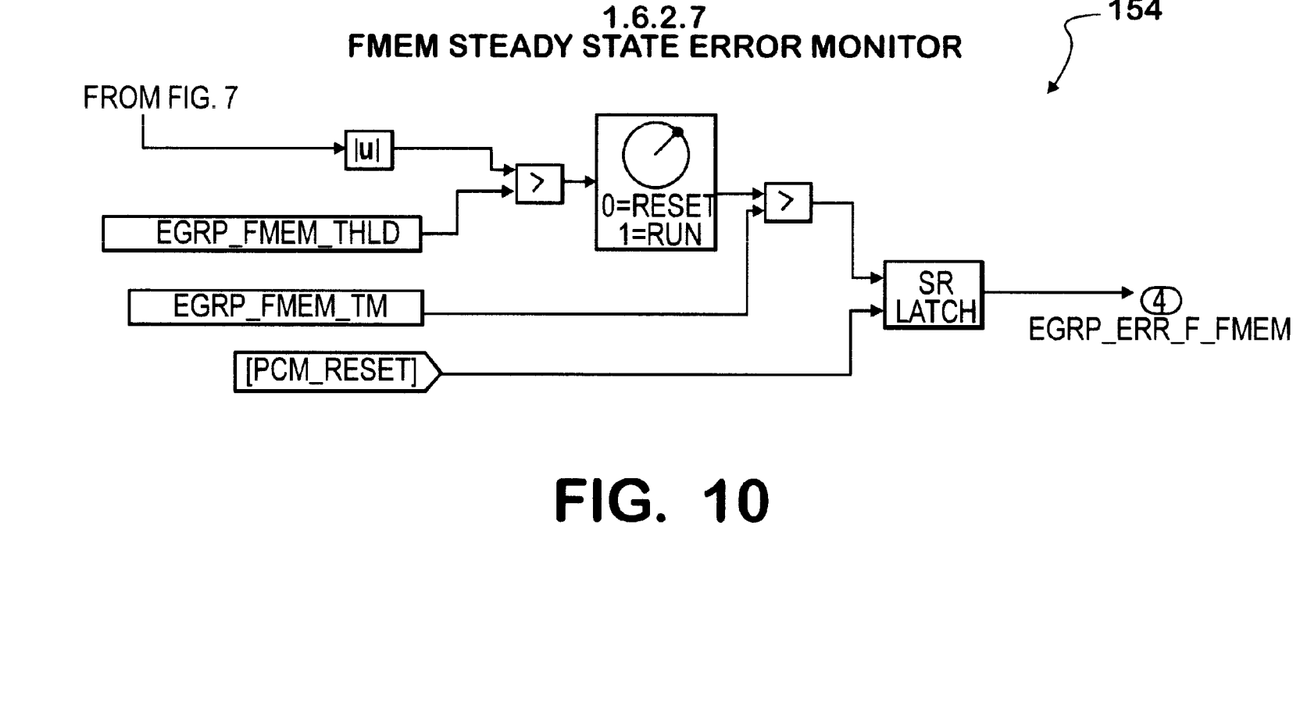
FIG. 10 is a more detailed diagram of another portion of the fifth block of FIG. 4.

FIG. 9 shows two of three event monitors represented by block 1.6.2.7 of FIG. 4, while FIG. 10 shows a third monitor. The monitors of FIG. 9 are designated by reference numerals 150, 152, and that of FIG. 10 by reference numeral 154. Each event monitor has an event logging capability.

Event monitors 150, 152 monitor data signal EGR_RATE_ERR. A threshold value EGR_RATE_FMEM_THLD for data signal EGR_RATE_ERR is set in monitor 150, and a threshold value EGR_RATE_OBDII_THLD for data signal EGR_RATE_ERR is set in monitor 152. A time limit EGR_RATE_FMEM_TM is set in monitor 150, and a time limit EGR_RATE_OBDII_TM is set in monitor 152. Each monitor 150, 152 comprises a respective timer 156, 158, and a respective latch 160, 162.

Each monitor 150, 152 monitors the absolute magnitude of data signal EGR_RATE_ERR by comparing it (respective steps 164, 166) to the absolute magnitude of the respective threshold, as shown. The respective timer 156, 158 is allowed to run only so long as the respective comparison 164, 166 shows that the magnitude of the respective signal exceeds the respective threshold.

Each monitor 150, 152 also compares (steps 168, 170) the elapsed running time of the respective timer 156, 158 with the respective time limit. When the elapsed running time of a respective timer exceeds the respective time limit, the event is logged by latching the respective latch, which thereby provides a signal of event occurrence. Each latch may be reset by a respective reset signal.

While the two monitors are ostensibly identical, their respective thresholds and time limits are intentionally set to be different. In particular, the purpose of monitor 150 is to log an event that may be indicative of an incipient condition in the EGR system and/or one or more of its components that, if allowed to continue, may cause the event to be logged by monitor 152. In other words, monitor 150 can provide an early indication of a potential condition that, if allowed to continue uncorrected, may cause monitor 152 to log an event indicative of the condition.

The monitoring function performed by monitor 152 is one that may be required by governmental regulation of motor vehicles. By providing monitor 150 with its ability to log, in its incipiency, an event that may eventually be logged by monitor 152, the opportunity for correcting an underlying problem before it is mandatorily logged by monitor 152 is presented. The opportunity for early correction provides obvious advantages for all concerned parties. Hence, the threshold and time limit values for monitor 150 are deliberately set lower than the respective values imposed by regulation on monitor 152.

Governmental regulation that may be applicable to EGR is believed to concern EGR rate, in which case the function provided by monitor 152 may be mandated in a motor vehicle. The present invention therefore incorporates monitor 150 to mimic monitor 152, but with lower threshold and time limit values. The invention also recognizes a potential benefit by employing monitor 154 to monitor signal EGRP_ERR.

Monitor 154 is shown to be organized and arranged in the same fashion as monitors 150, 152. By monitoring EGR valve position signal error in like manner to the monitoring of EGR rate signal error by monitors 150, 152, and logging any event indicative of an incipient condition that may deserve correction, early investigation may be made, and corrective action taken, if found appropriate. It should be noted that the EGR control strategy of the invention, as described above with reference to the cascaded PI control functions, will always strive to secure correspondence of the actual EGR rate to the desired EGR rate, even if in accomplishing this objective, the EGR position error may cause monitor 154 to log an event. Hence, monitor 154 is intended to aid diagnosis and corrective action for events that could eventually impact EGR rate control and result in event logging by monitor 152.

Figure 11A:
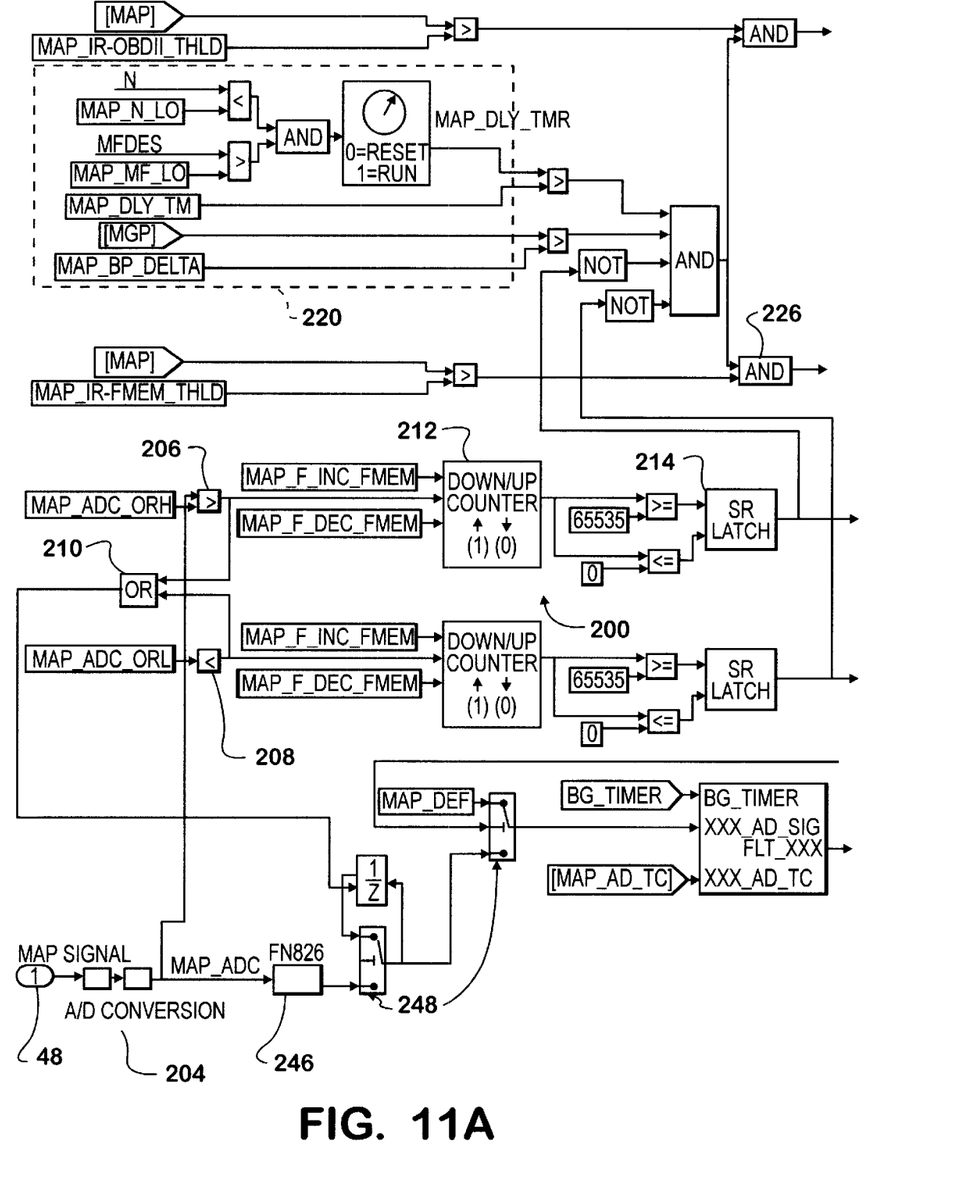
FIG. 11 is a detailed diagram that is associated with one sensor and includes certain event monitoring features.
Figure 11B:
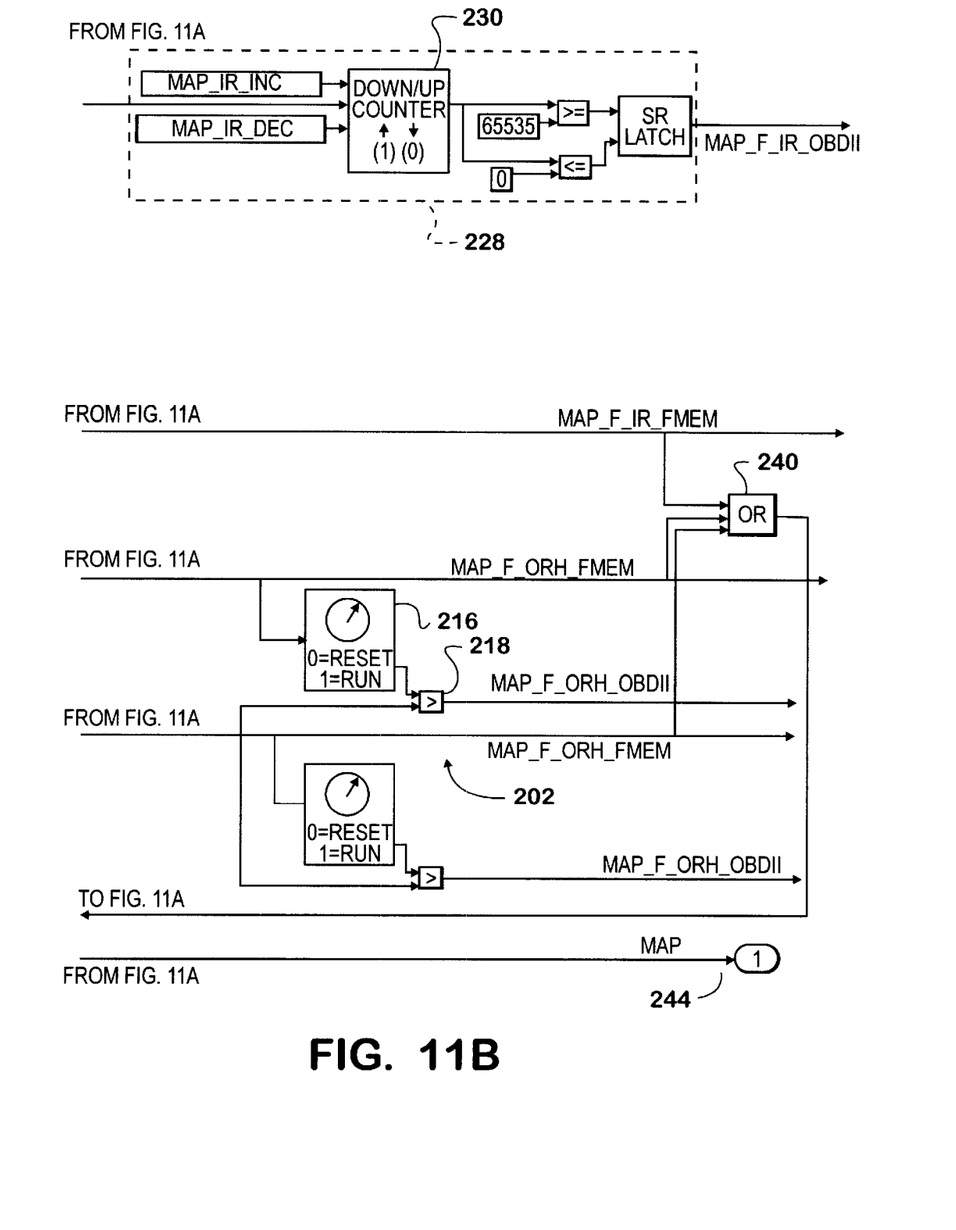

FIG. 11 shows two monitors 200, 202 that are associated with MAP sensor 48 for monitoring sensor operation and logging certain events related to sensor operation. Similar to the logging of events indicating abnormal EGR rates, governmental regulation requiring logging of events indicative of abnormal MAP sensor operation and/or abnormal manifold pressure conditions may also be imposed on the vehicle and/or engine. A known MAP sensor operates over a certain range coextensive with a range of manifold pressures encountered in normal engine operation. Hence, a MAP sensor will output a signal that falls within a normal operating range. A signal outside that range, either higher or lower, is suggestive of an abnormal pressure condition in the manifold and/or a faulty MAP sensor, including any electric circuit associated with the sensor.

One monitor monitors the MAP sensor output signal for operation within a normal operating range that is defined between a high limit and a low limit. The sensor signal is processed to a suitable digital form (step 204) and compared (step 206) against a data signal MAP_ADC_ORH that defines the high limit; it is also compared (step 208) against a data signal MAP_ADC_ORL that defines the low limit. Whenever, either the sensor signal exceeds the upper limit or (reference numeral 210) is less than the lower limit, a default value defined by a data signal MAP_DEF is used by the control for the MAP signal. Sensor activity outside the normal range of operation is also monitored for possible event logging.

Whenever the MAP signal exceeds the high limit, a counter 212 is incremented. When the MAP signal is equal to or less than the high limit counter 212 is decremented. The increment and decrement rates may be the same or different. The count in the counter can range from zero to a defined maximum, 65535 being the maximum in this example. If the MAP sensor signal remains above the high limit for a sufficiently long time in relation to the amount of time that it is equal to or less than the high limit, then the count in counter 212 will accumulate to the defined maximum of 65535 counts. When that happens, a latch 214 is set, logging occurrence of the event, with the latch issuing a signal MAP_F_ORH_FMEM to indicate the occurrence. Setting the latch also starts a timer 216 running. So long as the latch remains set, timer 216 continues to run. The elapsed time on timer 216 is compared (reference numeral 218) to a limit defined by a signal MAP_F_OR_OBDIITM, and when the elapsed time exceeds the limit, another signal for indicating occurrence of that event MAP_F_ORH_OBDII is also issued and logged.

Although latch 214 may have been set, it is nonetheless possible for the latch to be reset should the MAP sensor signal fall back within range for a sufficient amount of time to cause counter 212 to decrement to zero. Upon ceasing to exceed the high limit, the sensor signal will cause counter 212 to begin decrementing. When the count reaches zero, latch 214 is reset. This turns off the MAP_F_ORH_FMEM signal and resets timer 216 to zero.

It can be appreciated that the signal MAP_F_ORH_FMEM will occur before the signal MAP_F_ORH_OBDII, and in this way provide an opportunity for correction of a problem before the signal MAP_F_ORH_OBDII would otherwise be mandatorily logged.

From consideration of FIG. 11, the reader can appreciate that a similar arrangement monitors the MAP sensor signal relative to the lower limit and issues signals MAP_F_ORL_FMEM and MAP_F_ORL_OBDII in similar fashion, as called for.

It is also deemed desirable to confirm that the MAP sensor is operating in a rational manner when the engine is running under relatively light load. Certain inputs, such as engine speed and desired fuel mass flow, are monitored for conditions indicative that the engine has been running in a lightly loaded condition for a certain minimum amount of time. That determination is represented by the block labeled 220. If that condition is satisfied, and if monitors 200, 202 indicate that the MAP sensor is not above or below its high an low out of range limits, then an AND gate 222 enables two other AND gates 224, 226. The other input to AND gate 224 is the result of comparing the MAP sensor output signal MAP with a signal called MAP_IR_OBDII_THLD. The other input to AND gate 226 is the result of comparing the MAP sensor output signal MAP with a signal called MAP_IR_FMEM_THLD.

Each signal MAP_IR_OBDII_THLD and MAP_IR_FMEM_THLD represents a respective threshold. The former may be one that is mandated by government regulation; the latter, a lower one that is used to detect, in its incipiency, an event that may eventually be logged for compliance with governmental regulation if it persists without correction. Hence, whenever the engine is running lightly loaded, and the signal MAP exceeds the threshold represented by signal MAP_IR_FMEM_THLD, the signal MAP_F_IR_FMEM is given and logged, affording the opportunity for investigation, and corrective action if needed, before the governmentally mandated logging would occur.

Block 228 represents an arrangement like the ones previously described for monitoring MAP out-of-range-high and out-of-range-low. Whenever the signal MAP exceeds the signal MAP_IR_OBDII_THLD, with the engine warmed up and running lightly loaded as determined by block 220, a counter 230 is incremented. If the count builds beyond a defined number (65535 for example), a latch is set to cause a signal MAP_F_IR_OBDII to be given and logged. If, before the count exceeds the defined limit, the signal MAP ceases to exceed the signal MAP_IR_OBDII_THLD, then the counter decrements.

The signals MAP_F_IR_FMEM, MAP_F_ORH_FMEM, and MAP_F_ORL_FMEM are monitored by an OR gate 240. Whenever any one of these three signals is given, a default value represented by signal MAP_DEF is processed by the controller as the MAP signal instead of the actual MAP signal. The MAP signal marked 244 in FIG. 11 is the MAP signal that is processed by the controller. The block 246 represents scaling of the MAP sensor signal, after its A-D conversion by block 204. The reference numerals 248 represent the equivalent of an integrator for accomplishing low-pass filtering of the scaled MAP signal.

A MAF monitor (not shown in a separate Figure) monitors the MAF sensor in the same way as the MAP monitor of FIG. 11 monitors the MAP sensor. The MAF monitor has virtually the exact same arrangement as the MAP monitor of FIG. 11 to monitor for incipiency of events, and provide the potential for correction of their cause or causes before the events would otherwise have to be logged by mandated government regulation.

The inventive subject matter disclosed herein possess various aspects. One general aspect relates to the EGR control strategy employing an inner feedback loop using EGR valve position feedback and an outer feedback loop using EGR rate as feedback. More specific aspects include details of the strategy.

Another general aspect relates to the two-tier, or two-level, monitoring of the EGR control: one, logging of a monitored event mandated by government regulation, such as for OBDII compliance; the other, an incipiency monitor for monitoring events that could, if allowed to persist, eventually lead to mandated logging for compliance with government regulation. The incipiency monitor can alert the driver or operator of the vehicle that a service technician should check the engine for an incipient problem and possible correction before a mandated event logging would otherwise occur. More specific aspects include details of the monitors and monitoring.

Still another general aspect relates to sensor monitors and monitoring, including two-level monitors and monitoring, especially for MAP and MAF sensors. This allows an alert to be given during the incipiency of a potential problem so that it can be corrected before mandatory logging of an event occurs. More specific aspects relate to details of the monitors and monitoring.

While a presently preferred embodiment of the invention has been illustrated and described, it should be appreciated that principles of the invention are applicable to all embodiments that fall within the scope of the following claims.

What is claimed is:

1. A control system for a valve that controls exhaust gas recirculation in an internal combustion engine by selectively positioning a valve element that establishes the extent to which the valve is open, the control system comprising:

a processor that is configured for processing data in feedback control of the position of the valve element to develop from the data a position control signal for setting the extent to which the valve is open, including processing data corresponding to actual position of the valve element and data representing a desired position of the valve element to develop a position error signal, processing data that defines actual EGR rate and data representing a desired EGR rate to develop a rate error signal, and processing the position error signal and the rate error signal to develop the position control signal.

2. A control system as set forth in claim 1 in which the processor is configured to provide an inner feedback loop and an outer feedback loop, the processor processes the data corresponding to actual position of the valve element and the data representing a desired position of the valve element in one of the feedback loops, and the processor processes the data that defines actual EGR rate and the data representing a desired EGR rate in the other feedback loop.

3. A control system as set forth in claim 2 in which the processor processes the data corresponding to actual position of the valve element and the data representing a desired position of the valve element in the inner feedback loop, and the processor processes the data that defines actual EGR rate and the data representing a desired EGR rate in the outer feedback loop.

4. A control system as set forth in claim 3 in which inner feedback loop has a faster frequency response than the outer feedback loop.

5. A control system as set forth in claim 1 in which the processor is configured for processing the position error signal through a proportional and integral control to develop the control signal.

6. A control system as set forth in claim 1 in which the processor is configured for processing the rate error signal through a proportional and integral control to develop the control signal.

7. A control system as set forth in claim 1 in which the processor is configured for processing the position error signal and the rate error signal through respective proportional and integral controls to develop the control signal.

8. A control system as set forth in claim 7 in which the processor is configured for imposing limits on the integral portion of each proportional and integral control.

9. A control system as set forth in claim 1 in which the data representing a desired EGR rate is developed by the processor processing certain data that includes data defining desired mass fuel into the engine and data defining actual engine speed.

10. A control system as set forth in claim 9 in which the processor is configured to apply a transient multiplier to the processing of the data defining desired mass fuel into the engine and the data defining actual engine speed to compensate for transients in mass fuel into the engine.

11. A control system as set forth in claim 1 in which a position sensor associated with the valve element provides the data corresponding to actual position of the valve element.

12. A control system as set forth in claim 1 in which a pulse width modulated signal corresponding to the control signal is applied to the valve to position the valve element.

13. A control system as set forth in claim 1 in which the data that defines actual EGR rate is developed by the processor processing certain data that includes data defining fresh air mass entering an intake system of the engine and pressure and temperature of air entering an intake manifold of the engine.

14. A method for control of exhaust gas recirculation in an internal combustion engine by selectively positioning a valve element that establishes the extent to which an exhaust gas recirculation valve is open, the method comprising:
  processing data in feedback control of the position of the valve element to develop from the data a position control signal for setting the extent to which the valve is open, including processing data corresponding to actual position of the valve element and data representing a desired position of the valve element to develop a position error signal, processing data that defines actual EGR rate and data representing a desired EGR rate to develop a rate error signal, and processing the position error signal and the rate error signal to develop the position control signal.

15. A method as set forth in claim 14 in which the step of processing data corresponding to actual position of the valve element and data representing a desired position of the valve element to develop a position error signal comprises processing the data corresponding to actual position of the valve element and the data representing a desired position of the valve element in one feedback loop, and the step of processing data that defines actual EGR rate and data representing a desired EGR rate to develop a rate error signal comprises processing the data that defines actual EGR rate and the data representing a desired EGR rate in another feedback loop.

16. A method as set forth in claim 14 in which the step of processing data corresponding to actual position of the valve element and data representing a desired position of the valve element to develop a position error signal comprises processing the data corresponding to actual position of the valve element and the data representing a desired position of the valve element in an inner feedback loop, and the step of processing data that defines actual EGR rate and data representing a desired EGR rate to develop a rate error signal comprises processing the data that defines actual EGR rate and the data representing a desired EGR rate in an outer feedback loop that has a slower frequency response than the inner feedback loop.

17. A method as set forth in claim 14 including the step of processing the position error signal through a proportional and integral control to develop the control signal.

18. A method as set forth in claim 14 including the step of processing the rate error signal through a proportional and integral control to develop the control signal.

19. A method as set forth in claim 14 including the steps of processing each of the position error signal and the rate error signal through a respective proportional and integral control to develop the control signal.

20. A method as set forth in claim 19 including the steps of imposing respective limits on respective integrations performed by integral portions of the respective proportional and integral controls.

21. A method as set forth in claim 14 in which the step of developing data representing a desired EGR rate comprises processing data defining desired mass fuel into the engine and data defining actual engine speed.

22. A method as set forth in claim 21 including the step of applying a transient multiplier to the processing of the data defining desired mass fuel into the engine and the data defining actual engine speed to compensate for transients in mass fuel into the engine.

23. A method as set forth in claim 14 in which the step of developing data that defines actual EGR rate comprises processing data defining fresh air mass entering an intake system of the engine and pressure and temperature of air entering an intake manifold of the engine.

24. An event monitoring system in an exhaust gas recirculation system of an internal combustion engine comprising an exhaust gas recirculation valve through which exhaust gas is recirculated and which comprises a valve element that is selectively positioned by a position error signal in a feedback loop of a closed loop control to establish the extent to which the valve is open, the event monitoring system comprising:
  a valve monitor for monitoring the time for which the magnitude of the position error signal exceeds a position error threshold and for logging the occurrence of an event when the time for which the magnitude of the position error signal exceeds the position error threshold exceeds a time threshold.

25. An event monitoring system as set forth in claim 24 further including a rate monitor for monitoring the time for which the magnitude of an exhaust gas recirculation rate error signal of another feedback loop of the closed loop control exceeds a rate error threshold and for logging the occurrence of an event when the time for which the magnitude of the rate error signal exceeds the rate error threshold exceeds another time threshold.

26. A method of event monitoring in an exhaust gas recirculation system of an internal combustion engine comprising an exhaust gas recirculation valve through which exhaust gas is recirculated and which comprises a valve element that is selectively positioned by a position error signal in a feedback loop of a closed loop control to establish the extent to which the valve is open, the method comprising:

monitoring the time for which the magnitude of the position error signal exceeds a position error threshold and logging the occurrence of an event when the time for which the magnitude of the position error signal exceeds the position error threshold exceeds a time threshold.

27. A method of event monitoring as set forth in claim 26 further including monitoring the time for which the magnitude of an exhaust gas recirculation rate error signal of another feedback loop of the closed loop control exceeds a rate error threshold and logging the occurrence of an event when the time for which the magnitude of the rate error signal exceeds the rate error threshold exceeds another time threshold.

28. An event monitoring system in an exhaust gas recirculation control system of an internal combustion engine, the event monitoring system comprising:

a first monitor for monitoring the time for which the magnitude of a signal used in the control system exceeds a first threshold and for logging the occurrence of a first event when the time for which the magnitude of the signal exceeds the first threshold exceeds a first time threshold; and a second monitor for monitoring the time for which the magnitude of the signal exceeds a second threshold and for logging the occurrence of a second event when the time for which the magnitude of the signal exceeds the second threshold exceeds a second time threshold.

29. An event monitoring system as set forth in claim 28 in which the value of the first threshold is less than the value of the second threshold, and the first time limit is shorter than the second time limit.

30. An event monitoring system as set forth in claim 28 in which the signal represents a position error signal in a feedback loop of a closed loop control that establish the extent to which an exhaust gas recirculation valve.

31. An event monitoring system as set forth in claim 28 in which the signal represents an abnormality in a sensor.

32. An event monitoring system in an internal combustion engine emission control system, the event monitoring system comprising:

a first monitor for monitoring the time for which the magnitude of a signal used in the emission control system exceeds a first threshold and for logging the occurrence of a first event when the time for which the magnitude of the signal exceeds the first threshold exceeds a first time threshold; and a second monitor for monitoring the time for which the magnitude of the signal exceeds a second threshold and for logging the occurrence of a second event when the time for which the magnitude of the signal exceeds the second threshold exceeds a second time threshold.

33. An event monitoring system as set forth in claim 32 in which the signal represents an error signal in a feedback loop of a closed loop control of the emission control system.

34. An event monitoring system as set forth in claim 32 in which the signal represents an abnormality in a sensor of the emission control system.

35. An event monitoring method in an internal combustion engine emission control system, the method comprising:

monitoring the time for which the magnitude of a signal used in the emission control system exceeds a first threshold and logging the occurrence of a first event when the time for which the magnitude of the signal exceeds the first threshold exceeds a first time threshold; and monitoring the time for which the magnitude of the signal exceeds a second threshold and for logging the occurrence of a second event when the time for which the magnitude of the signal exceeds the second threshold exceeds a second time threshold.

* * * * *